UNITED STATES PATENT OFFICE.

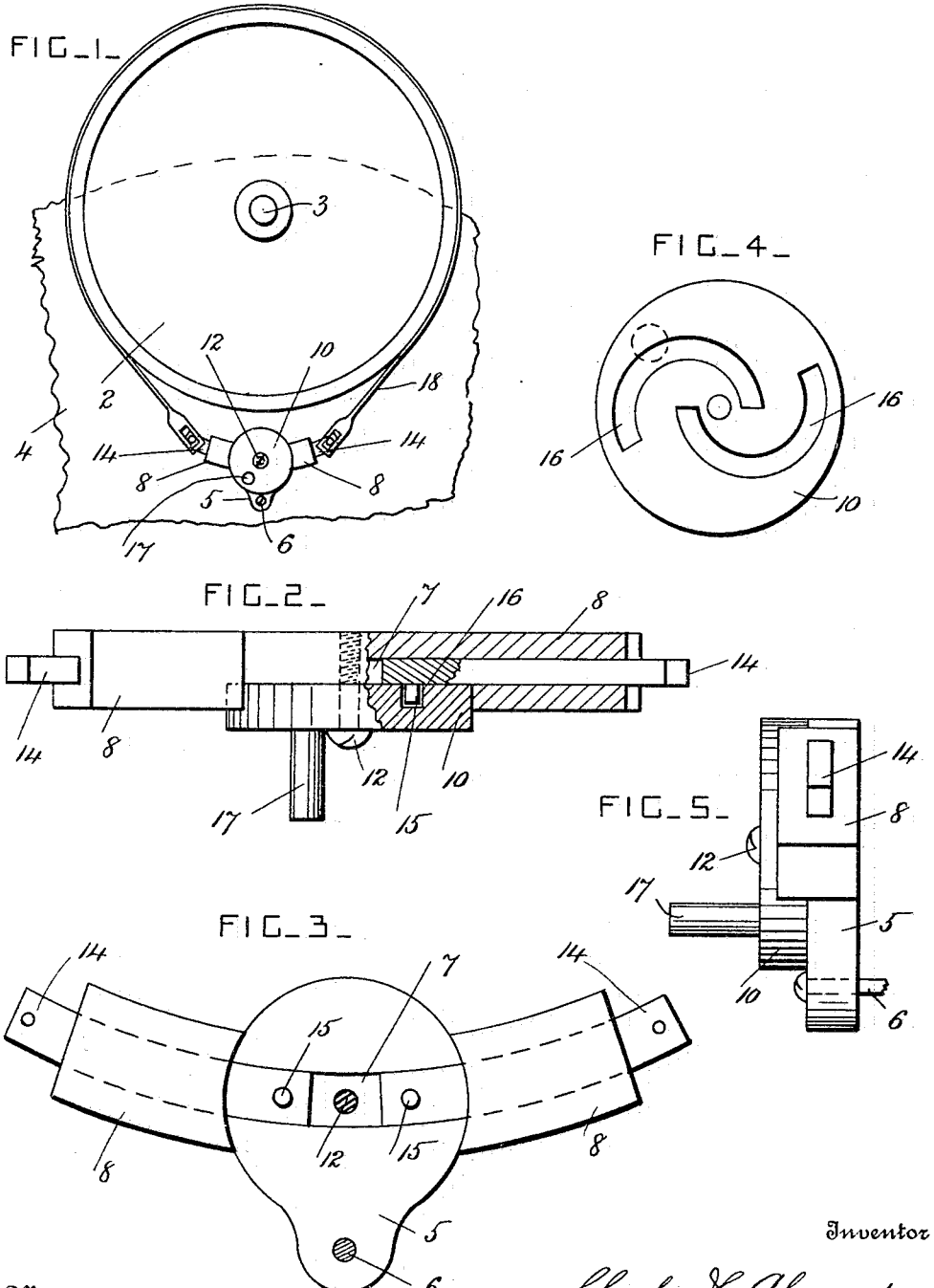

CHARLES H. ALEXANDER, OF NEWBURGH, NEW YORK.

FRICTION-BRAKE.

1,121,222.   Specification of Letters Patent.   Patented Dec. 15, 1914.

Application filed November 6, 1913. Serial No. 799,492.

*To all whom it may concern:*

Be it known that I, CHARLES H. ALEXANDER, a citizen of the United States, residing at Newburgh, in the county of Orange and State of New York, have invented certain new and useful Improvements in Friction-Brakes; and I do hereby declare the following to be a full, clear, and exact description of the invention, such as will enable others skilled in the art to which it appertains to make and use the same.

This invention relates to friction band brakes such as used on motor cars and all kinds of machinery; and it consists in the novel construction and combination of the parts hereinafter fully described and claimed.

In the drawings, Figure 1 is a side view of a wheel provided with a brake according to this invention. Fig. 2 is a plan view of the brake bracket and disk, drawn to a larger scale and partially in section. Fig. 3 is a front view of the brake bracket with the brake disk removed. Fig. 4 is a detail view of the brake disk showing the cam grooves. Fig. 5 is an end view of the brake bracket.

The brake wheel 2 is mounted on a shaft 3 journaled in a frame or support 4, and all of these parts are of any approved construction.

A bracket 5 is secured to the frame 4 by a bolt 6, arranged at its middle part, and is pivotally adjustable thereon. A curved groove 7, formed on the arc of a circle, is provided in the bracket 5, and rectangular guide sockets 8 are formed on the end portions of the bracket and the curved or straight slot extends through them. A brake disk 10 is provided and is pivoted on a pin 12 at the central part of the bracket, and the periphery of this disk bears against the adjacent ends of the guide sockets 8 which are correspondingly curved. The groove 7 is rectangular, and 14 are rectangular bars which are slidable in it. The curved bars 14 have laterally projecting pins 15 at their adjacent end portions, which engage with overlapping cam-shaped grooves 16 formed in the face of the brake disk which bears against the brake bracket. The brake disk is provided with a handle 17 or other suitable means for oscillating it. The brake band 18 is formed of any suitable flexible material. It partially encircles the brake wheel, and its ends are secured to the projecting outer ends of the curved bars 14. The length of the brake band can be adjusted where it is secured to one or both of the bars, and the connection can be made in any approved way which will permit the parts to work freely.

The brake is applied by moving the brake disk in one direction, and the brake will work equally well for both directions of the revolution of the brake wheel. The bearing of the brake disk on the ends of the guide sockets relieves the central pivot pin of undesirable strain.

What I claim is:

The combination, with a brake wheel, of a stationary bracket arranged to one side of the brake wheel and having a slot and tubular guide sockets arranged at the ends of the slot and forming a continuation thereof, bars slidable in the slot and guide sockets and having laterally projecting pins at their adjacent end portions, a brake band engaging with the brake wheel and having its ends connected to the outer ends of the said bars, and an operating disk pivoted to the middle part of the bracket between the guide sockets and provided with cam surfaces which engage with the said pins.

In testimony whereof I have affixed my signature in the presence of two witnesses.

CHARLES H. ALEXANDER.

Witnesses:
W. G. BROWN,
GEO. H. COE.

Copies of this patent may be obtained for five cents each, by addressing the "Commissioner of Patents, Washington, D. C."